US010648144B2

(12) United States Patent
Dean et al.

(10) Patent No.: US 10,648,144 B2
(45) Date of Patent: May 12, 2020

(54) UNIVERSAL DOCK AND WATERCRAFT PROTECTION SYSTEM

(71) Applicants: Stephen Jon Dean, Tallassee, AL (US); Robert Eric Baker, Tallassee, AL (US); William Terry Robertson, Jr., Dadeville, AL (US)

(72) Inventors: Stephen Jon Dean, Tallassee, AL (US); Robert Eric Baker, Tallassee, AL (US); William Terry Robertson, Jr., Dadeville, AL (US)

( * ) Notice: Subject to any disclaimer, the term of this patent is extended or adjusted under 35 U.S.C. 154(b) by 0 days.

(21) Appl. No.: 16/153,554

(22) Filed: Oct. 5, 2018

(65) Prior Publication Data

US 2019/0112773 A1  Apr. 18, 2019

Related U.S. Application Data

(60) Provisional application No. 62/571,373, filed on Oct. 12, 2017.

(51) Int. Cl.
*E02B 3/26* (2006.01)
*B63B 59/00* (2006.01)

(52) U.S. Cl.
CPC ............... *E02B 3/26* (2013.01); *B63B 59/00* (2013.01)

(58) Field of Classification Search
CPC . E02B 3/26; E02B 3/28; E02B 17/003; B63B 59/02
USPC .................................................. 405/212, 215
See application file for complete search history.

(56) References Cited

U.S. PATENT DOCUMENTS

| | | | | |
|---|---|---|---|---|
| 2,577,236 A * | 12/1951 | Doherty | .................... | E02B 3/26 114/219 |
| 3,179,397 A * | 4/1965 | Cleereman | ................. | E02B 3/26 267/140 |
| 4,579,344 A * | 4/1986 | Meggs | ................. | A63B 63/004 114/219 |
| 5,247,897 A * | 9/1993 | Pepp | ....................... | B63B 59/02 114/219 |
| 6,371,039 B1 * | 4/2002 | Hemphill | ................ | B63B 59/02 114/219 |
| 2004/0069203 A1 * | 4/2004 | Fleming | .................. | B63B 7/082 114/345 |

* cited by examiner

*Primary Examiner* — Sean D Andrish
(74) *Attorney, Agent, or Firm* — Frank Marino

(57) ABSTRACT

A dock and boat protection system includes a flexible sheet, fasteners, and a plurality of colinearly aligned marine fenders. The sheet has an envelope portion sized to at-least-partially surround fenders when conformed there-around, and an edge portion extending from the envelope portion and configured to engage a dock, wherein the edge portion is secured to the dock by the fasteners.

20 Claims, 6 Drawing Sheets

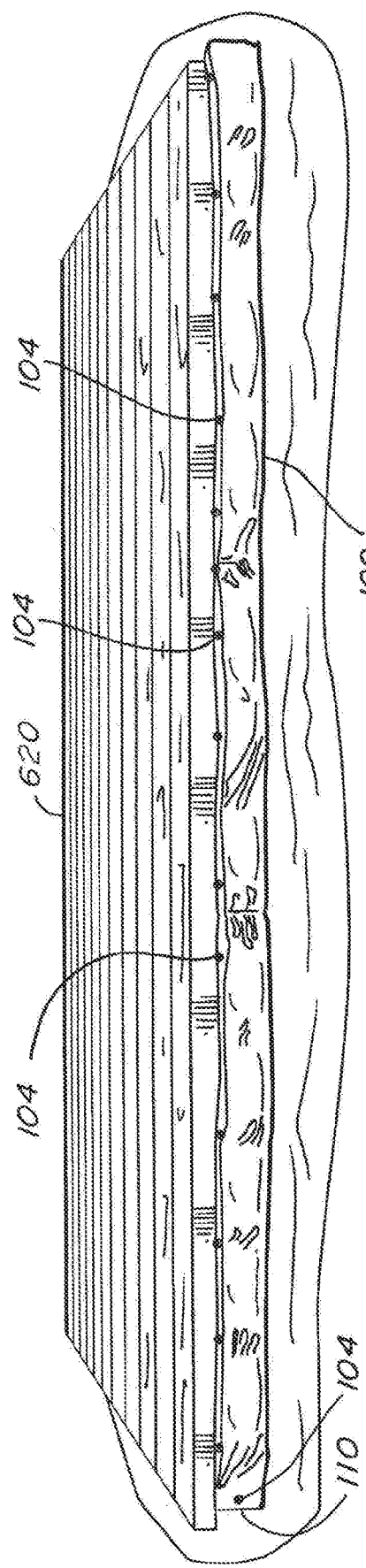
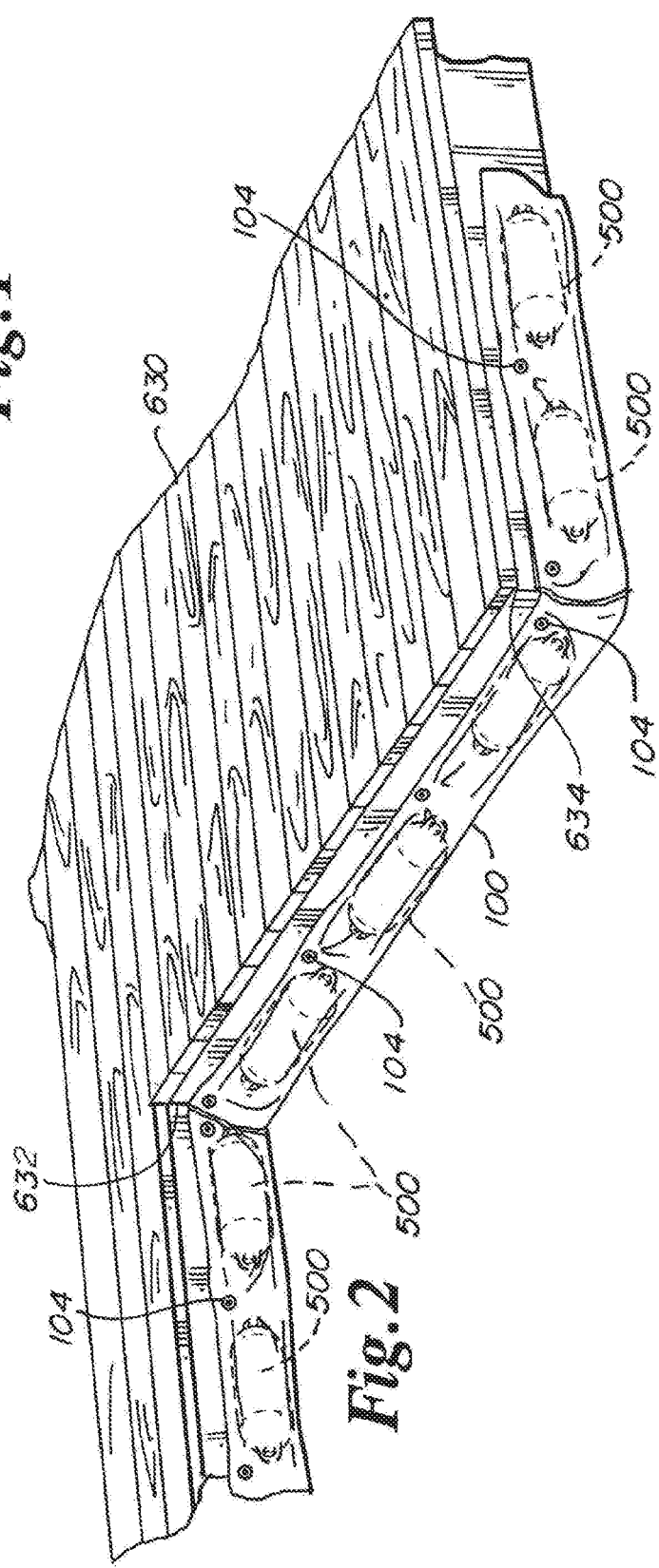

UNIVERSAL DOCK AND WATERCRAFT PROTECTION SYSTEM

FIELD

The present invention is related to systems for protecting docks and watercraft when the watercraft are approaching or tied to the docks.

BACKGROUND

A common and age-old problem is the potential for damage to either the dock or the boat, or both, when a boat approaches and is secured to a dock. Approaching the dock can sometimes be traumatic, and wind and waves can often batter the boat against the dock causing damage even when secured. Fenders and other bumper systems are common, but all are either limited in their functionality or expensive and complicated to install. Fenders that affix to the dock's tying posts or cleats are often necessarily mispositioned relative to the boat. Fenders that affix to the boat are often necessarily mispositioned relative to the dock. Docks are built in an infinite variety of shapes and sizes, and boats are made in a huge variety of shapes and sizes, so providing a system for protecting all boats at all docks and protecting all docks from all boats is a need that is heretofore unfulfilled. When the term "dock" is used herein, it is intended to refer to either a dock extending from shore, an "island" dock moored off-shore, a floating swim platform moored offshore, another boat, or any equivalent structure to which an in-water boat may be tied.

There is the need to provide a system for better protecting docks and watercraft when the watercraft are approaching or tied to the docks. There is the additional need to provide such a system which may employ, in part, existing marine fenders. There is the additional need to provide such a system that is adaptable to a multitude of dock shapes. There is the additional need to provide such a system that is adaptable to a multitude of dock lengths. There is the additional need to provide such a system that is adaptable to a multitude of dock heights. There is the additional need to provide such a system that is adaptable to a multitude of boat shapes. There is the additional need to provide such a system that is adaptable to a multitude of boat lengths. There is the additional need to provide such a system that is adaptable to a multitude of boat heights. Further needs will become apparent upon perusal of the disclosure herein.

SUMMARY

The herein disclosed system, and equivalents thereto, protect docks and boats when the boats are docking at or docked at the docks, regardless of the shape and size of the boat and/or the dock. The system is adaptable to an infinite number of dock sizes and arrangements and may employ standard marine fenders as cushioning. Alternatively, the cushioning may be accomplished by other means, such as foam filling. A linear fabric envelope may be provided in various pre-made lengths or may be cut to length according to need and secured to the dock with the fenders trapped therein.

It is therefore an object of the present invention to provide a system for better protecting docks and watercraft when the watercraft are approaching or tied to the docks. It is an additional object of the invention, to provide such a system which may employ, in part, existing fenders. It is an additional object of the invention, to provide such a system that is adaptable to a multitude of dock shapes. It is an additional object of the invention, to provide such a system that is adaptable to a multitude of dock lengths. It is an additional object of the invention, to provide such a system that is adaptable to a multitude of dock heights. It is an additional object of the invention, to provide such a system that is adaptable to a multitude of boat shapes. It is an additional object of the invention, to provide such a system that is adaptable to a multitude of boat lengths. It is an additional object of the invention, to provide such a system that is adaptable to a multitude of boat heights. It is another object of the present invention to provide such a system which employs an inexpensive linear fabric envelope which may be provided in various pre-made lengths or may be cut to length according to need and secured to the dock with the fenders trapped therein. Further objects will become apparent upon perusal of the disclosure herein.

BRIEF DESCRIPTION OF THE DRAWINGS

FIG. 1 is perspective view of an end of a side of a rectangular dock employing a protector according to a first exemplary embodiment of the invention;

FIG. 2 is perspective view of an L-shaped dock employing the protector FIG. 1;

DESCRIPTION OF EXEMPLARY EMBODIMENTS

Figure 9:
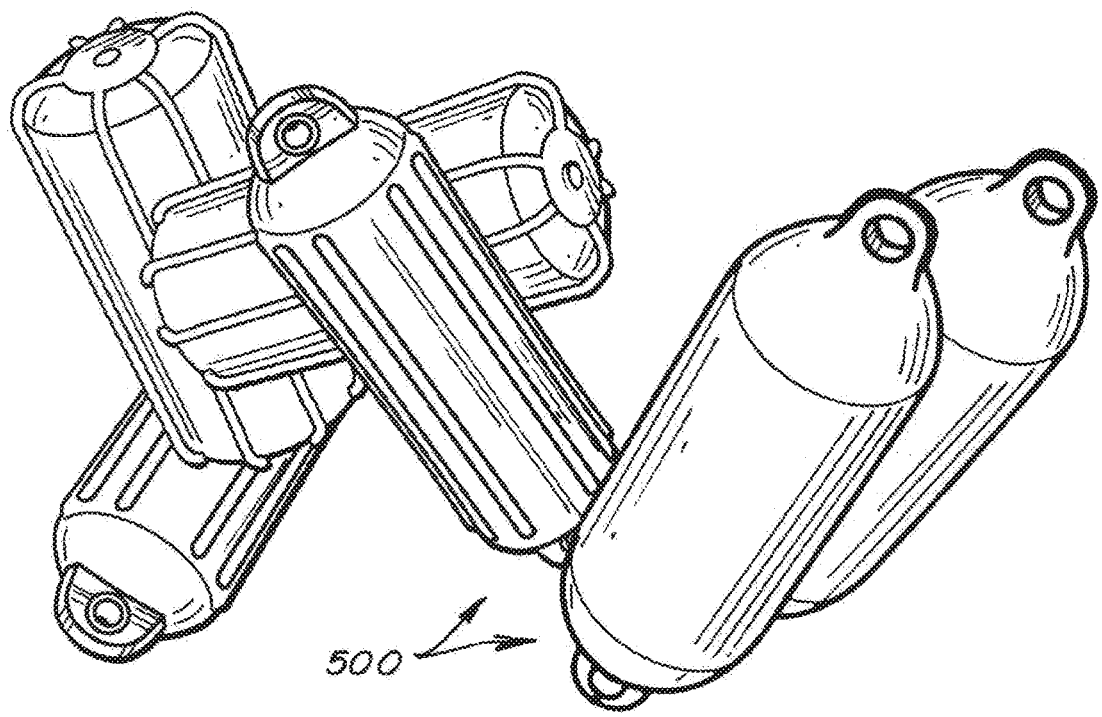
FIG. 9 is a perspective view of various prior art marine fenders which may be employed in the protectors of FIG. 1, 6, or 8.

Referring first to FIG. 9, various prior art marine fenders 500 are shown. These are typically inflated flexible vinyl vessels that serve as cushions and have means for affixing lines thereto so that the fenders may be tied to or hung from a boat or dock. While these are relatively inexpensive and have long been proven capable of providing adequate and reliable protection to both docks and boats, their securement and displacement is cumbersome, and needs to be re-arranged at the dock according to the particular boat being docked there-at or re-arranged at the boat according to the particular dock it is docking at.

Figure 4A:
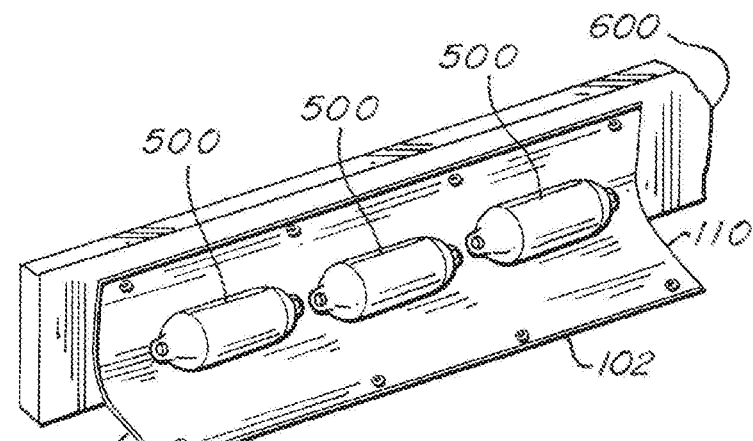
FIGS. 4A, 4B, and 4C are a sequential series of perspective views of the assembly of the protector of FIG. 1 to a length of dock.
Figure 4B:
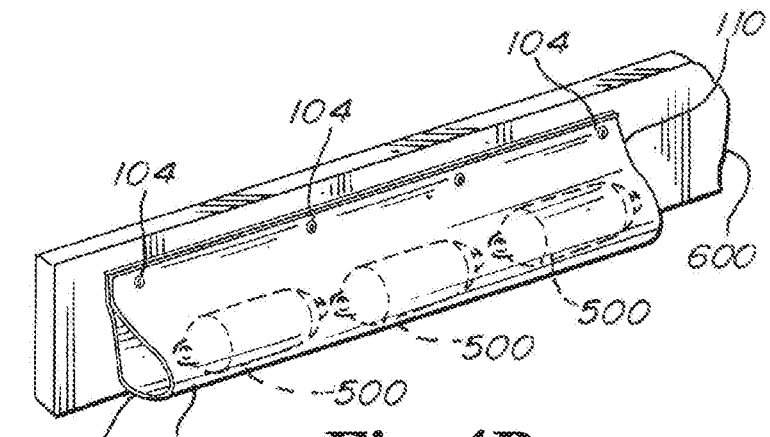
Figure 4C:
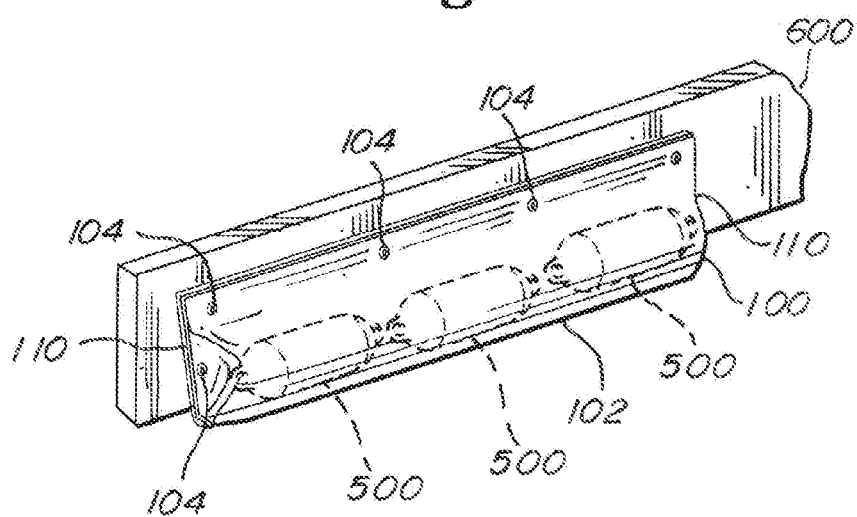

Referring next to FIGS. 4A through 4C, the assembly of a plurality of fenders 500 into a length of dock/watercraft protector 100 is shown. Besides the fenders, the protector includes a length of flexible sheet 102 and fasteners 104. In FIG. 4A, the sheet is affixed linearly along the dock 600 and affixed along top edge 106 by a plurality of evenly spaced fasteners 104. Holes for the fasteners may be provided, drilled by the end user, or made by screwing the fasteners through the sheet and into the dock. As shown in FIG. 4B, the lower edge 108 of the sheet is then rolled up around the plurality of fenders and secured to the dock adjacent the top edge. A single line of fasteners may secure each of the top and bottom edges to the dock, or the same line of fasteners may secure both the top and bottom edges. In FIG. 4C, the end edges 110 of the sheet have lastly been secured to the dock by fasteners 104 to enclose the fenders therein.

Figure 3:
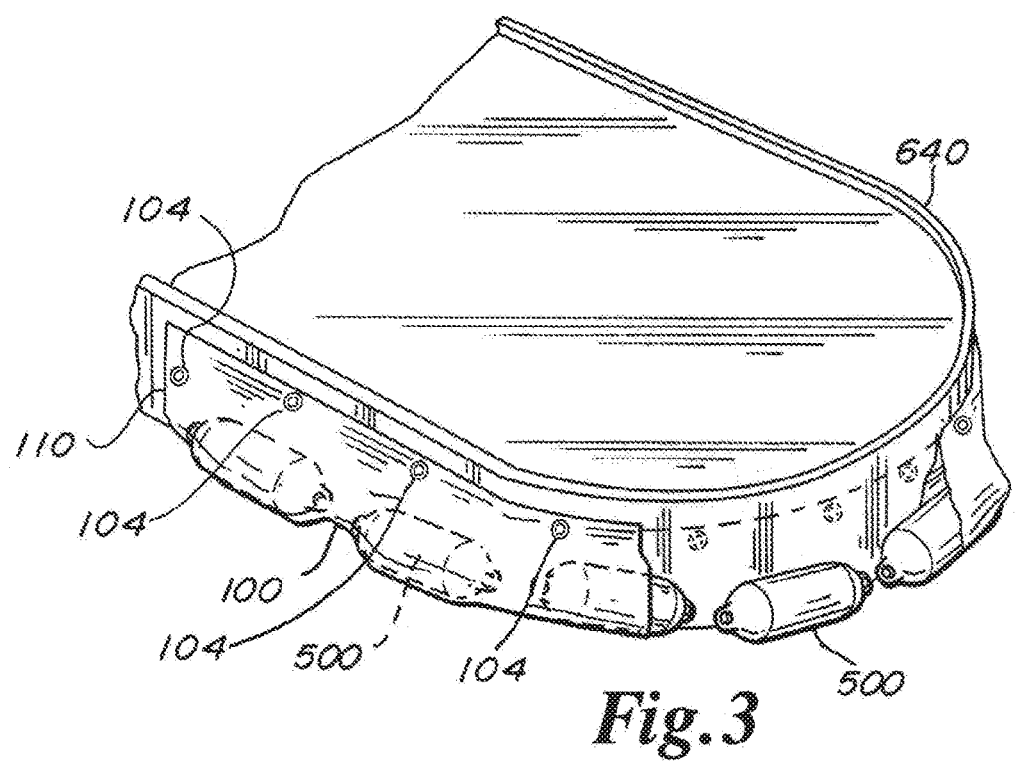
FIG. 3 is perspective view of a round-ended dock employing the protector of FIG. 1.

FIG. 1 shows protector 100 affixed to a linear dock 620. FIG. 2 shows protector 100 affixed along the contours of an L-shaped dock 630. FIG. 3 shows protector 100 affixed around the end of a rounded dock 640.

Figure 5:
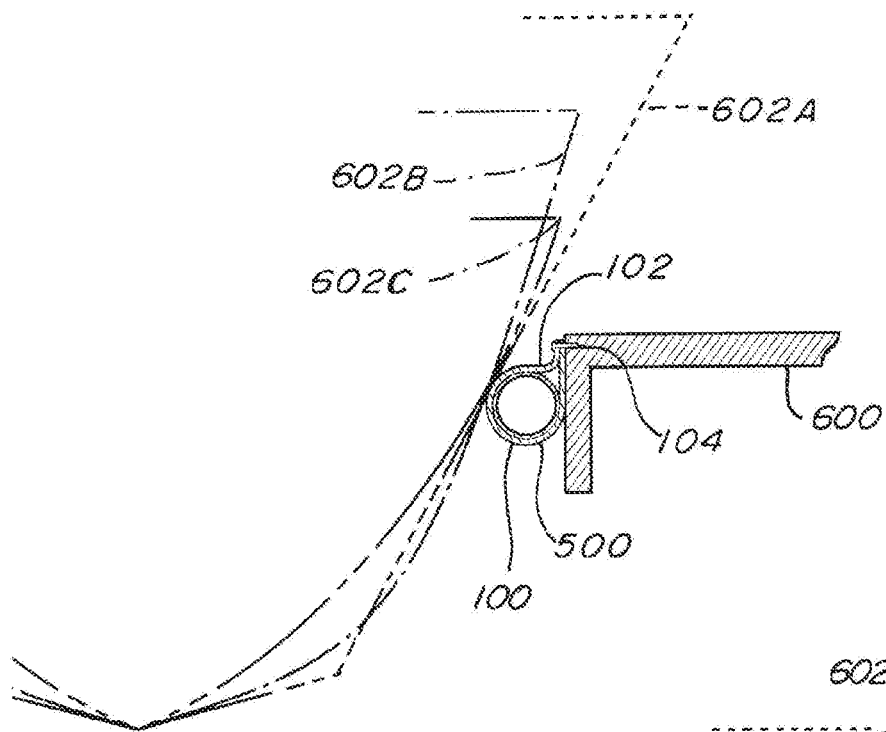
FIG. 5 is a cross-section through various boats tied to a dock employing the protector of FIG. 1.

FIG. 5 shows the relationship of various boats 602A, 602B, and 602C and a typical dock 600 which has been fitted with the protector 100 as was shown in FIGS. 4A-4C. Note that because the protector positions its internal fenders 500 in a disposition that protrudes signification outwardly from the dock, the fender is capable of interfacing with the boat regardless of its height or the slope of its bow.

Figure 7A:
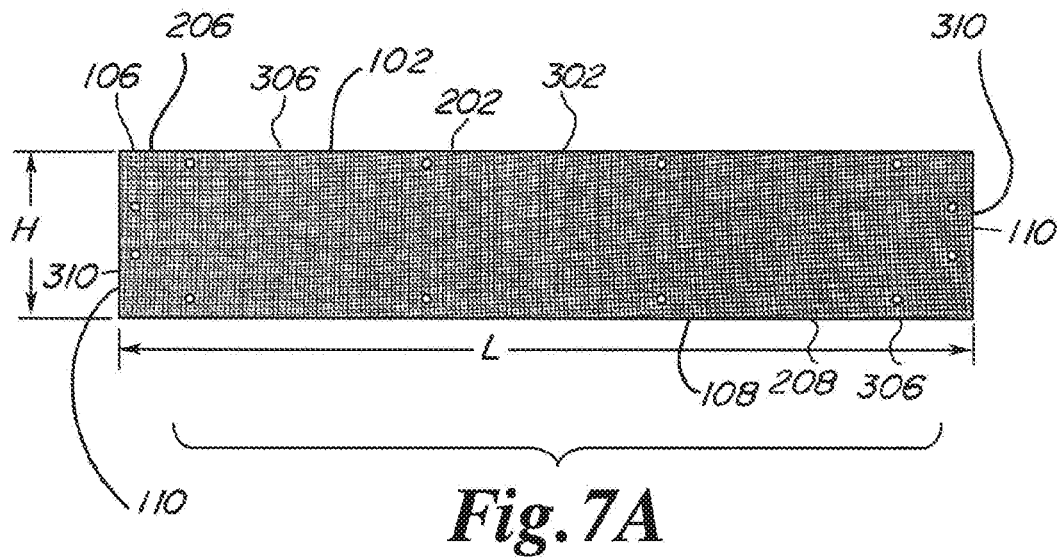
FIG. 7A is a dimension drawing for a fabric panel of the first and second exemplary protector of FIGS. 1 and 6.

The sheet material may be provided in a roll and cut to the desired length therefrom, or it may be provided in a variety of pre-selected lengths, such as shown in FIG. 7A. The length L to which it is cut or provided is preferably six to ten inches longer than some multiple of the length of the plurality fenders to allow for the ends 110 of the sheet to extend beyond each end of the plurality of fenders and be fastened to the dock as shown in FIGS. 1, 2, 3, and 4C. For instance, if the fenders are each eighteen inches long and a protector approximately six feet long is desired, four fenders would be used. Those would have a length of four multiples of the eighteen inches . . . or six feet . . . so the sheet would be from seventy-eight to ninety-two inches long.

The height H of the sheet should be six to ten inches taller that the circumference of the fenders being used to allow the top and bottom edges to extend above the fenders and be fastened to the dock as shown. For instance, if the fenders are six inches in diameter, their circumferences would be approximately nineteen inches and height H should be twenty-four to twenty-nine inches.

When assembled, such as shown in FIGS. 1, 2, 3, and 5 the protector provides a suitable cushioning between virtually any boat and the dock, which draws on the established cushioning capability and reliability and the low cost of the prior art marine fenders without requiring the burdensome repositioning of the fenders for each new boat that may wish to tie to the dock.

Figure 6:
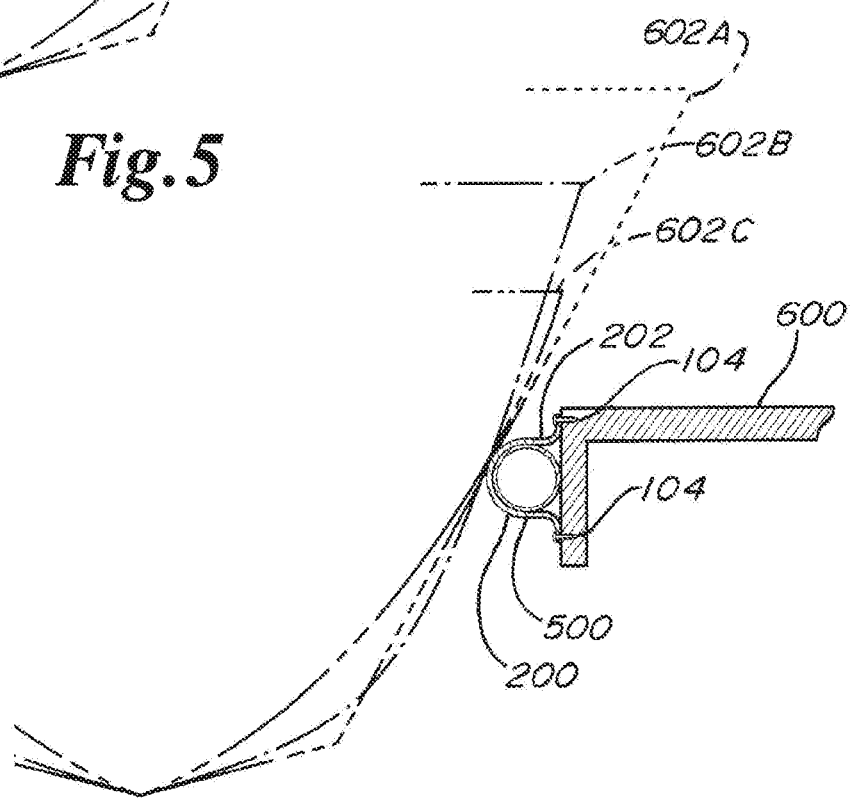
FIG. 6 is a cross-section through various boats tied to a dock employing a protector according to a second exemplary embodiment of the invention.
Figure 7B:
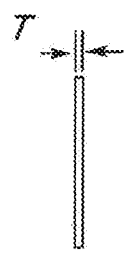
FIG. 7B is a side view of the panel of FIG. 7A.

FIG. 6 shows the relationship of the boats and the dock 600 which has instead been fitted with an alternative protector 200 which may be within the invention. In this version, sheet 202 would have the same length (L in FIG. 7A) and thickness (T in FIG. 7B), but would have a height (H in FIG. 7A) of approximately four to ten inches taller that the circumference of the fenders being used to allow the top and bottom edges to extend above and below the fenders and be fastened to the dock as shown. Such a version would be easier to affix to the dock by first affixing the lower edge 208 to the dock, cupping the sheet upwards, placing the fenders within the cupped sheet, then affixing the upper edge 206 of the sheet to the dock.

The sheets may be of such materials as fabric, rubber, or plastic, so long as it is sufficient tear and abrasion resistant for the purpose, but is preferably made of Waterproof UV-protected PVC tarpaulin. The preferred thickness T is 0.55 mm. While the fenders shown in FIG. 9 are most common and economical, and therefore preferred, the system may be easily adapted for use with other cushioning means, including other types of fenders, cushions, foam rubber, etc.

A unique feature of the invention is that the cushioning may be made into any approximate length, so it adapts to docks of all lengths. And the system may fit around external dock corners 634 or into internal dock corners 632, as shown in FIG. 2, or wrapped around rounded dock ends, as shown in FIG. 3, so that it is truly universal and adaptable to any sized or shaped dock, swim raft, etc.

Figure 10:
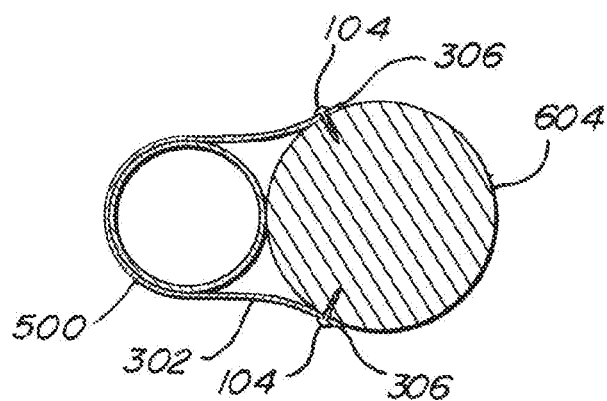
FIG. 10 is a cross sectional view through one of the protectors of FIG. 8.
Figure 8:
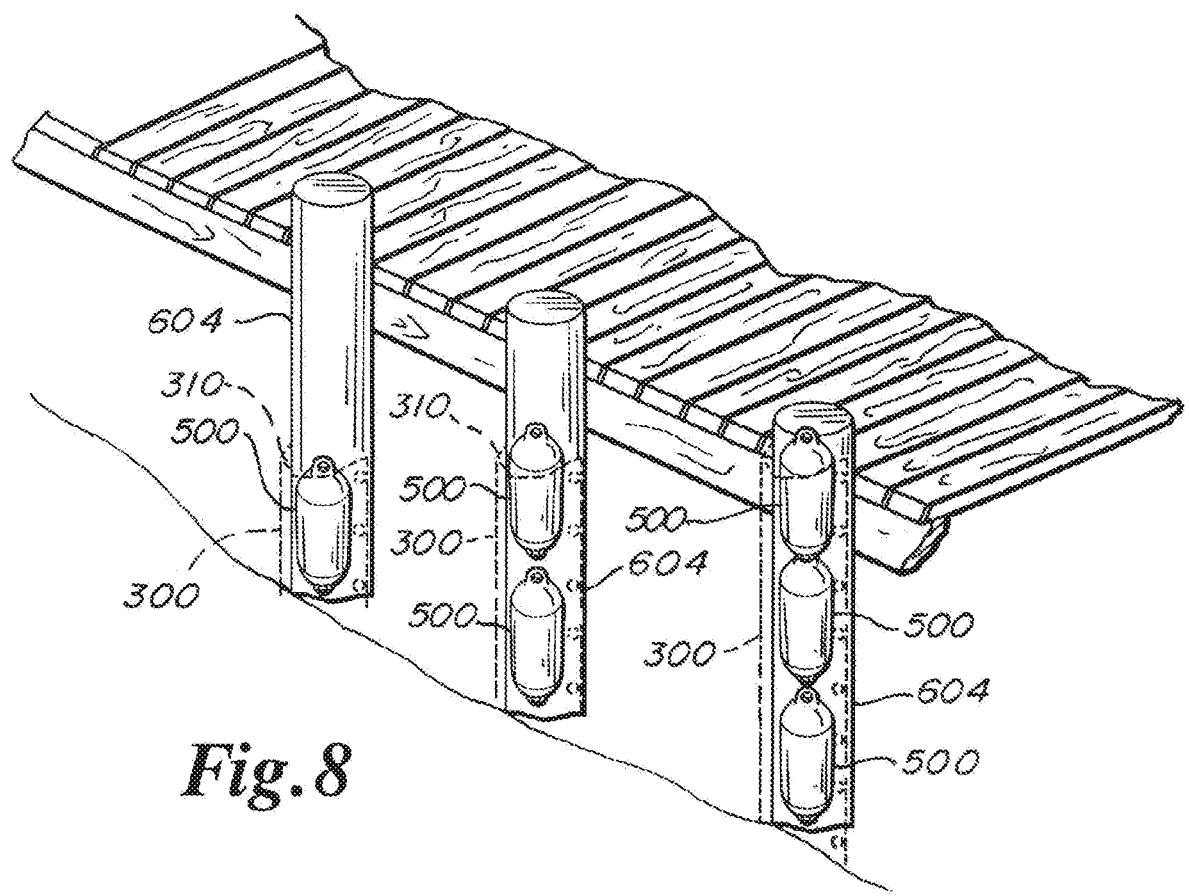
FIG. 8 is a perspective view of a dock employing protectors according to a third exemplary embodiment of the invention.

Referring next to FIG. 8, a third embodiment 300 is provided for protecting boats and a dock at the dock's upright posts or pilings. FIG. 10 shows the affixing method of sheet 302 to post 604. In this embodiment, the long edges are vertical side edges 306 and the short edges are top and bottom horizontal edges 310. The vertical edges and bottom end of the sheet are initially secured to the post to form an envelope. Several fenders are then dropped into the envelope. The top end of the envelop may then be closed and secured . . . or may be left open. The horizontal dimension of the sheet (H in FIG. 7A) is approximately eight to twelve inches wider that the circumference of the fenders being used to allow the side edges to extend from fenders and be fastened to the posts as shown.

While the forgoing provides several exemplary embodiments which are meant to demonstrate key aspects and advantages of the invention, it should be understood that the invention is not meant to be limited thereto. The invention should be limited only by the following claims, including all equivalents thereto.

We claim:

1. A dock protection system for affixation to docks having a variety of shapes and for adaptation thereto, and comprising a flexible sheet and fasteners:

the flexible sheet comprising an envelope portion sized to at-least-partially surround a plurality of elongate cushions when conformed there-around, each having a body with a length and terminal ends having a length that is smaller than the length of the body; and edge portions extending from the envelope portion and configured to engage the docks, wherein the edge portions are securable to the docks by the fasteners; wherein the envelope is adapted to capture the plurality of elongate cushions in a longitudinal series comprising the elongate cushions disposed end-to-end with at least one space between at least two adjacent of the cushions to enable folding of the envelope at the at least one space to conform to corners of the docks; and wherein the edge portions comprise lengthwise edges along the length and end edges along the terminal ends, and the lengthwise edges extend tangentially from the cushions to form substantially planar flanges through which the fasteners affix the flexible sheet to the docks.

2. The dock protection system of claim 1 wherein the lengthwise edges are horizontally securable to the docks by the fasteners to encase the elongate cushions longitudinally, and the end edges are securable to the docks to encase opposite longitudinal ends of the elongate cushions.

3. The dock protection system of claim 2 wherein the envelope portion is sized to at-least-partially surround the elongate cushions comprising cylindrical elongate cushions, and wherein the horizontally-secured lengthwise edges encase the cylindrical elongate cushions longitudinally, by at least partially surrounding the cylindrical elongate cushions when conformed there-around.

4. The dock protection system of claim 3 wherein the envelope portion is sized to at-least-partially surround the cylindrical elongate cushions comprising a plurality of co-linear cylindrical cushions when conformed there-around.

5. The dock protection system of claim 4 wherein the envelope portion and the lengthwise edges are adapted to fold inwardly and outwardly at the at least one space between the co-linear cylindrical cushions to conform to the internal and external dock corners, respectively.

6. The dock protection system of claim 3 wherein the lengthwise edges are securable to the docks above the cylindrical elongate cushions.

7. The dock protection system of claim 3 wherein the lengthwise edges comprise a top edge and a bottom edge and the top edge is securable to the docks above the cylindrical elongate cushions and the bottom edge is securable to the docks below the cylindrical elongate cushions.

8. A dock protection system for affixation to docks having a variety of shapes and for adaptation thereto, and comprising a flexible sheet, fasteners, and a plurality of elongate cushions each having a body with a length and terminal ends having a length that is smaller than the length of the body:
the sheet comprising an envelope portion sized to at-least-partially surround the plurality of elongate cushions when conformed there-around, and edge portions extending from the envelope portion and configured to engage the docks, wherein the edge portions are securable to the docks by the fasteners; wherein
the envelope portion is adapted to capture the plurality of elongate cushions in a longitudinal series comprising the elongate cushions disposed end-to-end with at least one space between at least two adjacent of the cushions to enable folding of the envelope at the at least one space to conform to corners of the docks; and wherein
the edge portions comprise lengthwise edges along the length and end edges along the terminal ends, and the lengthwise edges extend tangentially from the elongate cushions to form substantially planar flanges through which the fasteners affix the flexible sheet to the docks.

9. The dock protection system of claim 8 wherein the lengthwise edges are horizontally securable to the docks by the fasteners to encase the elongate cushions longitudinally, and the end edges securable to the docks to encase opposite longitudinal ends of the elongate cushions.

10. The dock protection system of claim 9 wherein the elongate cushions are cylindrical elongate cushions.

11. The dock protection system of claim 10 wherein the cylindrical elongate cushions comprise a plurality of co-linear cylindrical cushions.

12. The dock protection system of claim 11 wherein the envelope portion and the lengthwise edges are adapted to fold inwardly and outwardly at the at least one space between the co-linear cylindrical cushions to conform to the internal and external dock corners, respectively.

13. The dock protection system of claim 10 wherein the lengthwise edges are securable to the docks above the cylindrical elongate cushions.

14. The dock protection system of claim 10 wherein the lengthwise edges comprise a top edge and a bottom edge and the top edge is securable to the docks above the cylindrical elongate cushions and the bottom edge is securable to the docks below the cylindrical elongate cushions.

15. A dock protection system for affixation to docks having a variety of shapes and for adaptation thereto, and comprising a flexible sheet, fasteners, and a plurality of marine fenders each having a body with a length and terminal ends having a length that is smaller than the length of the body:
the sheet comprising an envelope portion sized to at-least-partially surround the plurality of marine fenders when conformed there-around, and
edge portions extending from the envelope portion and configured to engage the docks, wherein the edge portions are securable to the docks by the fasteners; wherein
the envelope portion is adapted to capture the plurality of marine fenders in a longitudinal series comprising the plurality of marine fenders disposed end-to-end with at least one space between at least two adjacent of the marine fenders to enable folding of the envelope at the at least one space to conform to corners of the docks; and wherein
the edge portions comprise lengthwise edges along the length and end edges along the terminal ends, and the lengthwise edges extend tangentially from the marine fenders to form substantially planar flanges through which the fasteners affix the flexible sheet to the docks.

16. The dock protection system of claim 15 wherein the lengthwise edges are horizontally securable to the docks by the fasteners to encase the plurality of marine fenders longitudinally, and the end edges are securable to the docks to encase opposite longitudinal ends of the plurality of marine fenders.

17. The dock protection system of claim 16 wherein the plurality of marine fenders comprises a plurality of co-linear marine fenders.

18. The dock protection system of claim 17 wherein the envelope portion and the lengthwise edges are adapted to fold inwardly and outwardly at the at least one space between the co-linear marine fenders to conform to the internal and external dock corners, respectively.

19. The dock protection system of claim 16 wherein the lengthwise edges are securable to the docks above the plurality of marine fenders.

20. The dock protection system of claim 16 wherein the lengthwise edges comprise a top edge and a bottom edge and the top edge is securable to the docks above the plurality of marine fenders and the bottom edge is securable to the docks below the plurality of marine fenders.

* * * * *